United States Patent
Jagota et al.

(10) Patent No.: US 8,898,186 B2
(45) Date of Patent: *Nov. 25, 2014

(54) METHODS AND SYSTEMS FOR LATENCY-FREE CONTACTS SEARCH

(75) Inventors: Arun Kumar Jagota, Sunnyvle, CA (US); Lei Ming, Fremont, CA (US); Fang Wong, Fremont, CA (US); Pawan Nachnani, Newark, CA (US)

(73) Assignee: salesforce.com, inc., San Francisco, CA (US)

( * ) Notice: Subject to any disclaimer, the term of this patent is extended or adjusted under 35 U.S.C. 154(b) by 485 days.

This patent is subject to a terminal disclaimer.

(21) Appl. No.: 13/104,226

(22) Filed: May 10, 2011

(65) Prior Publication Data

US 2012/0089638 A1    Apr. 12, 2012

Related U.S. Application Data

(60) Provisional application No. 61/391,486, filed on Oct. 8, 2010.

(51) Int. Cl.
  *G06F 17/30* (2006.01)
  *G06F 7/00* (2006.01)

(52) U.S. Cl.
  CPC .......... *G06F 17/30* (2013.01); *G06F 17/30327* (2013.01); *G06F 17/30495* (2013.01); *G06F 17/30321* (2013.01)
  USPC .......................................... 707/769; 707/797

(58) Field of Classification Search
  CPC .................... G06F 17/30495; G06F 17/30312; G06F 17/30477; G06F 17/30321
  USPC .......................... 707/705, 758, 769, 791, 797
  See application file for complete search history.

(56) References Cited

U.S. PATENT DOCUMENTS

| | | | |
|---|---|---|---|
| 5,551,024 A * | 8/1996 | Waters | 395/600 |
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,757,900 A * | 5/1998 | Nagel et al. | 379/221.09 |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,852,822 A * | 12/1998 | Srinivasan et al. | 707/4 |
| 5,873,096 A | 2/1999 | Lim et al. | |
| 5,878,431 A * | 3/1999 | Potterveld et al. | 707/694 |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |

(Continued)

*Primary Examiner* — Marc Somers
(74) *Attorney, Agent, or Firm* — Dergosits & Noah LLP; Todd A. Noah

(57) ABSTRACT

Systems and methods for performing latency-free contact searches using two-level indexed data structures having decreasing integer sets as identifiers to represent actual contact data. The indexed data structures are stored in distributed memory. Data operations such as intersection and union are performed using the indexed data structures. A binary interval reduction technique is used to quickly move through the data sets looking for common elements for the intersection set, or unique elements to add to the union set.

28 Claims, 11 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,278,008 B1 * | 10/2007 | Case et al. .................... 711/209 |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0004691 A1 * | 1/2006 | Sifry ................................ 707/1 |
| 2009/0063415 A1 | 3/2009 | Chatfield et al. |

* cited by examiner

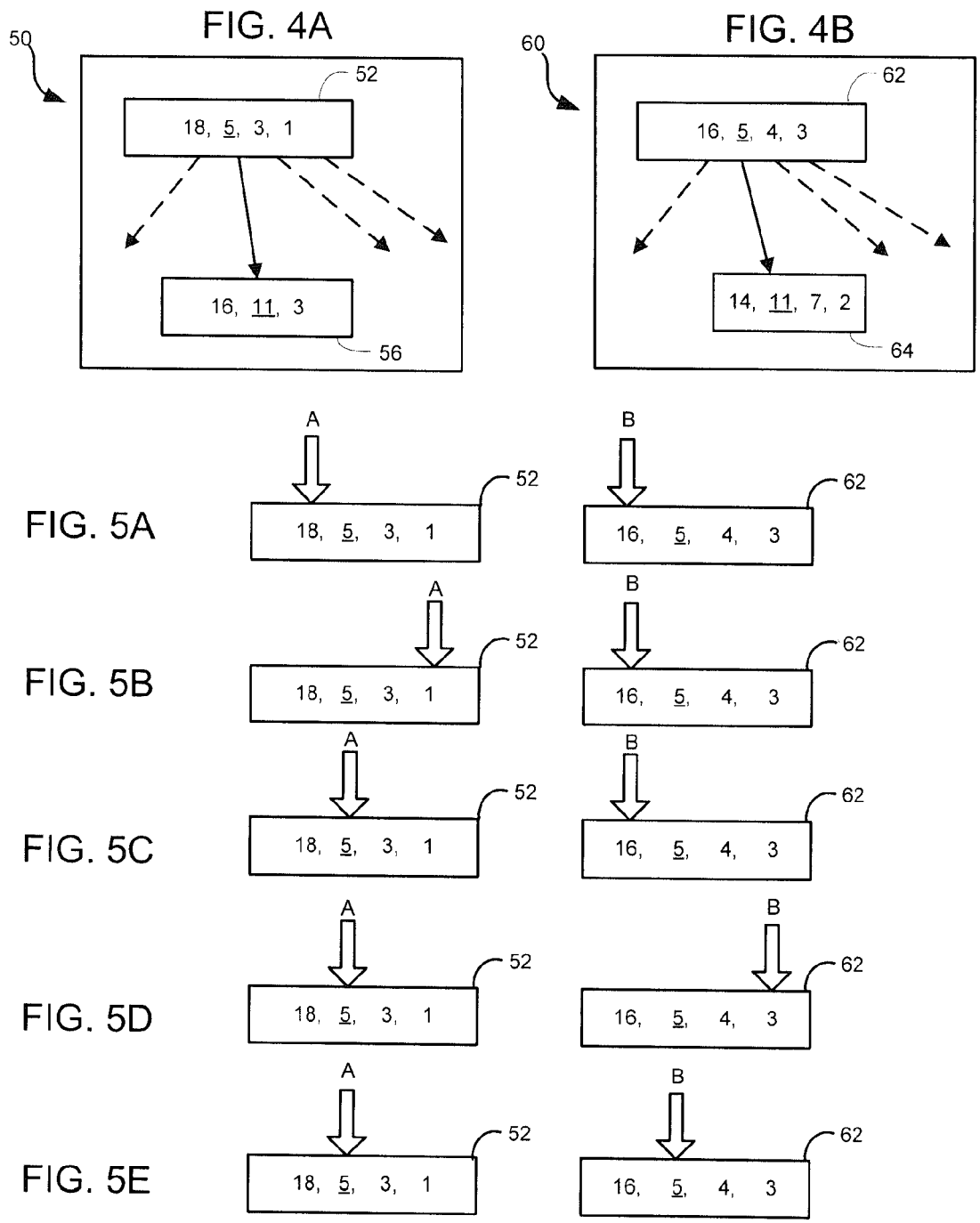

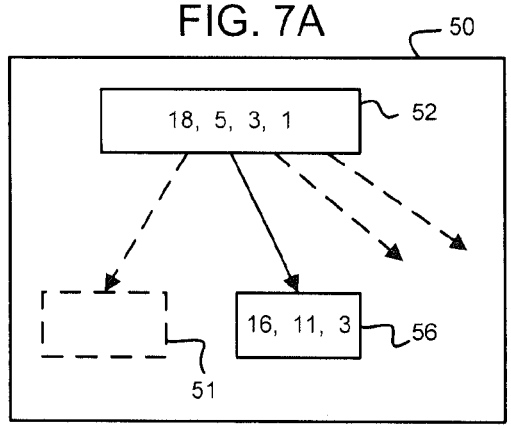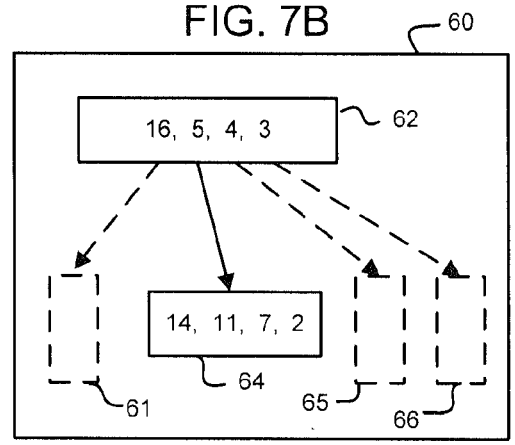
New List T1
Existing List S1
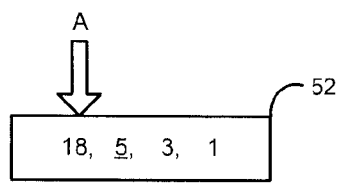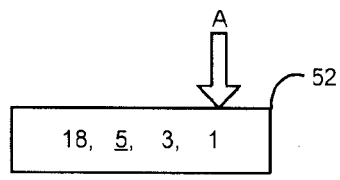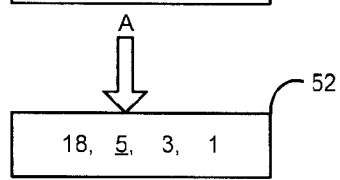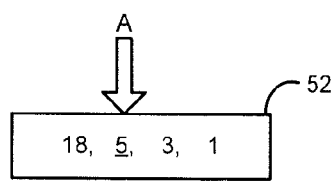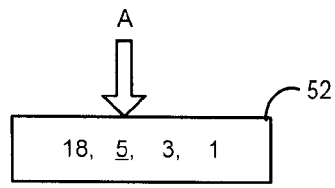

METHODS AND SYSTEMS FOR LATENCY-FREE CONTACTS SEARCH

CLAIM OF PRIORITY

This application claims the benefit of U.S. Provisional Patent Application 61/391,486 entitled A HIGHLY EFFICIENT AND SCALABLE SYSTEM FOR LATENCY-FREE MY CONTACTS SEARCH AND FOR INTERSECTION QUERIES, by Arun Kumar Jagota et al., filed Oct. 8, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the records of the United States Patent and Trademark Office, but otherwise reserves all rights.

TECHNICAL FIELD

One or more implementations relate generally to database queries.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which may be unique on their own.

In conventional database systems, users access their data resources in a single logical database. A user of such a conventional database system typically retrieves data from and stores data on the database system using the user's own computing systems or devices. For example, a user system might remotely access one of a plurality of server systems that might in turn access the database system. Data retrieval from the system might include the issuance of a query from the user system to the database system. The database system might process the request for information received in the query and send to the user system information relevant to the request. The retrieval of accurate information and subsequent delivery of this information to the user system in a timely and efficient manner has been and continues to be a goal of administrators of database systems.

However, in a multi-tenant database system ("MTS"), various elements of hardware and software of the database system may be shared by one or more customers. The notion of "cloud computing" has recently developed whereby service providers offer access to hardware/software systems through a network, such as the Internet. In an MTS, for example, a specified application server may simultaneously process requests for many customers, and a specified database table may store and index data for many customers, such as contact data.

One commercially available option for retrieving information from a database is the Lucene database model. Lucene is an open source software library product used for information retrieval, supported by the Apache Software Foundation, which provides full text indexing and searching capability. See lucene.apache.org. The logical architecture of Lucene defines an index as a sequence of documents; a document as a sequence of fields; a field is a named sequence of terms; and a term is a string. However, the physical structure stores data literally, meaning the entire data string is referenced in any access or query.

Conventional database systems are necessarily limited by server architectures, namely, by how much memory and/or disk space on the server is allocated to the database. From a resources point of view, this presents the issues (i) how much memory is available, and (ii) what is the speed of memory access? Since memory access is typically several orders of magnitude faster than disk access, more recent applications emphasize memory access when possible to obtain enhanced access speeds.

It remains an objective of database managers to find improved methods of storing and accessing data for use in data operations.

BRIEF SUMMARY

Systems and methods are described for performing latency-free database searches for contact data having desired attributes. Advantageously, contact data is represented by contact identifiers that are stored in distributed memory as a two-level indexed data structure having a first decreasing integer set with MSB portions of the contact identifier stored as the first level structure and a second decreasing integer set with LSB portions of the contact identifier stored as the second level structure and linked to the corresponding MSB in the first level structure.

Common data operations, such as the intersection of sets of identifiers, and the union of sets of identifiers, are performed using the indexed data structures, not the actual data. A binary interval reduction technique is used to quickly move through the decreasing integer sets looking for common elements for the intersection set, or unique elements to add to the union set.

An intersection operation is performed as part of a routine query to find data meeting specified attributes, that is, locating common elements having the specified attributes among a number of data sets. In an exemplary intersection operation, the set of contact identifiers for a first two-level indexed data structure is compared with the set of contact identifiers for a second two-level indexed data structure in order to find common integers. Instructions for performing an intersection operation between the first and second indexed data structures include performing a first series of comparison operations between the first levels of the first and second data structures using the binary interval reduction process to identify a first matching integer. If a first matching integer is found, then a second series of comparison operations is performed between the second levels of the first and second data structures that are linked to the first matching integer in the first level structures. Again, the binary interval reduction process is used to identify a second matching integer in the second levels of the first and second data structures. If a second matching integer is identified in the second levels of the first and second data structures, then the particular contact identifier having an MSB of the first matching integer and an LSB of the second matching integer is in the intersection set. The first and second matching integers are thus stored in distributed memory as an indexed data structure representing the intersection set. The comparison steps are repeated until all comparison operations are done.

A union operation is performed as part of a routine operation to add new data to an existing data set. In an exemplary union operation, the set of contact identifiers in a first two-level indexed data structure is added to the set of contact identifiers in a second two-level indexed data structure. Instructions for performing a union operation between the first and second data structures include performing a first series of comparison operations between the first level of the first data structure and the first level of the second data structure using a binary interval reduction process to identify matched and unmatched integers in the first level of the first and second data structures. If an integer in the first data structure is not found in the second data structure, then it must be added to the second data structure, and the unique set of second-level integers that is linked to this integer is retrieved and stored in the second level of an indexed data structure, which will be linked to this integer in the union set.

If a matched integer is found in the first level of the first and second data structures, then a second series of comparison operations is performed between the second level of the first data structure and the second level of the second data structure using the binary interval reduction process to identify matched and unmatched integers in the second level of the first data structures. The unmatched integers in the second level of the first data structure are stored with a link to the matched integer in the first level of the second data structure. The matched integers are ignored because they are already in the second data structure.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings, like reference numbers are used to refer to like elements. Although the following figures depict various examples, the one or more implementations are not limited to the examples depicted in the figures.

FIGS. 4A and 4B are block diagrams illustrating two data sets in an intersection operation;

FIGS. 5A through 5E illustrate the movement of pointers during an intersection operation on the data sets of FIGS. 4A and 4B;

FIGS. 7A and 7B are block diagrams illustrating two data sets in an intersection operation;

FIGS. 8A through 8E illustrate the movement of pointers during an intersection operation on the data sets of FIGS. 7A and 7B;

DETAILED DESCRIPTION

1. Overview

Systems and methods are described for using a distributed memory system, such as open source memcached storage technology, to facilitate storage, indexing and searching for data as part of database operations. Advantageously, the use of a distributed memory system can be horizontally scalable in relatively arbitrary lengths to provide a significant resource for database operations and management. In particular, utilizing a distributed memory system for database operations can result in greatly improved speeds for data access and query results.

In order to take better advantage of the distributed memory system, a compressed representation of data is used for permanent storage, for temporary storage during query operations; and for indexing. The use of compressed data minimizes storage requirements and leads to much faster intersection and union operations.

In one embodiment, data is compressed by storing it as a two-level tree structure, where each level of the structure takes up only half the space required for the full integer. Each level of the data structure is an ordered set of decreasing integers, with the first or top level storing a unique set of the Most Significant Bits (MSBs) for the data items, and the second level storing a unique set of the Least Significant Bits (LSBs) for the data items and providing a link to the corresponding first level MSB.

Advantageously, a first set of query operations are performed only on the top level MSB items initially, and then a second set of query operations are performed only on the second level items that are linked to the top level items resulting from the first set of query operations.

2. Hardware/Software Environment

A database is a well known component of computer-based systems providing structured storage for electronic data records. The database is accessed by users through computer-implemented devices in a computing environment. The database is configured to allow storing, indexing, searching and retrieving of a large number of data records, as well as security and backup for the system. The database is typically hosted on a single server, and management of the database is handled by a software utility (usually called DBMS) running on the database server and programmed in accord with application needs. Although it is typical for multiple databases to be hosted on a single server, database resources are necessarily limited by physical server capacity, and additional server capacity may sometimes be required for operations involving large data sets.

Figure 1A:
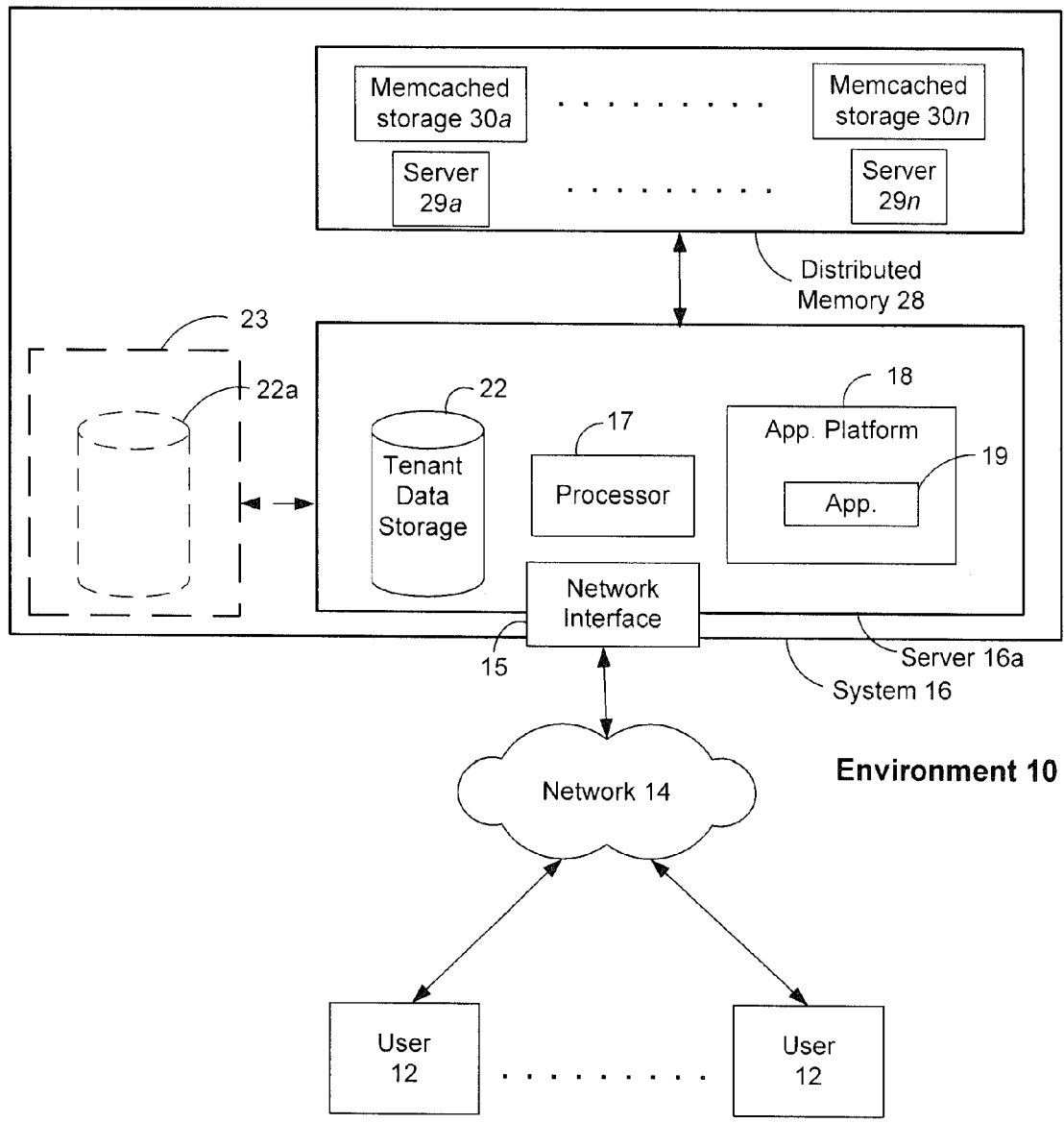
FIG. 1A is a simplified block diagram illustrating one embodiment of a multi-tenant database system ("MTS")
Figure 10:
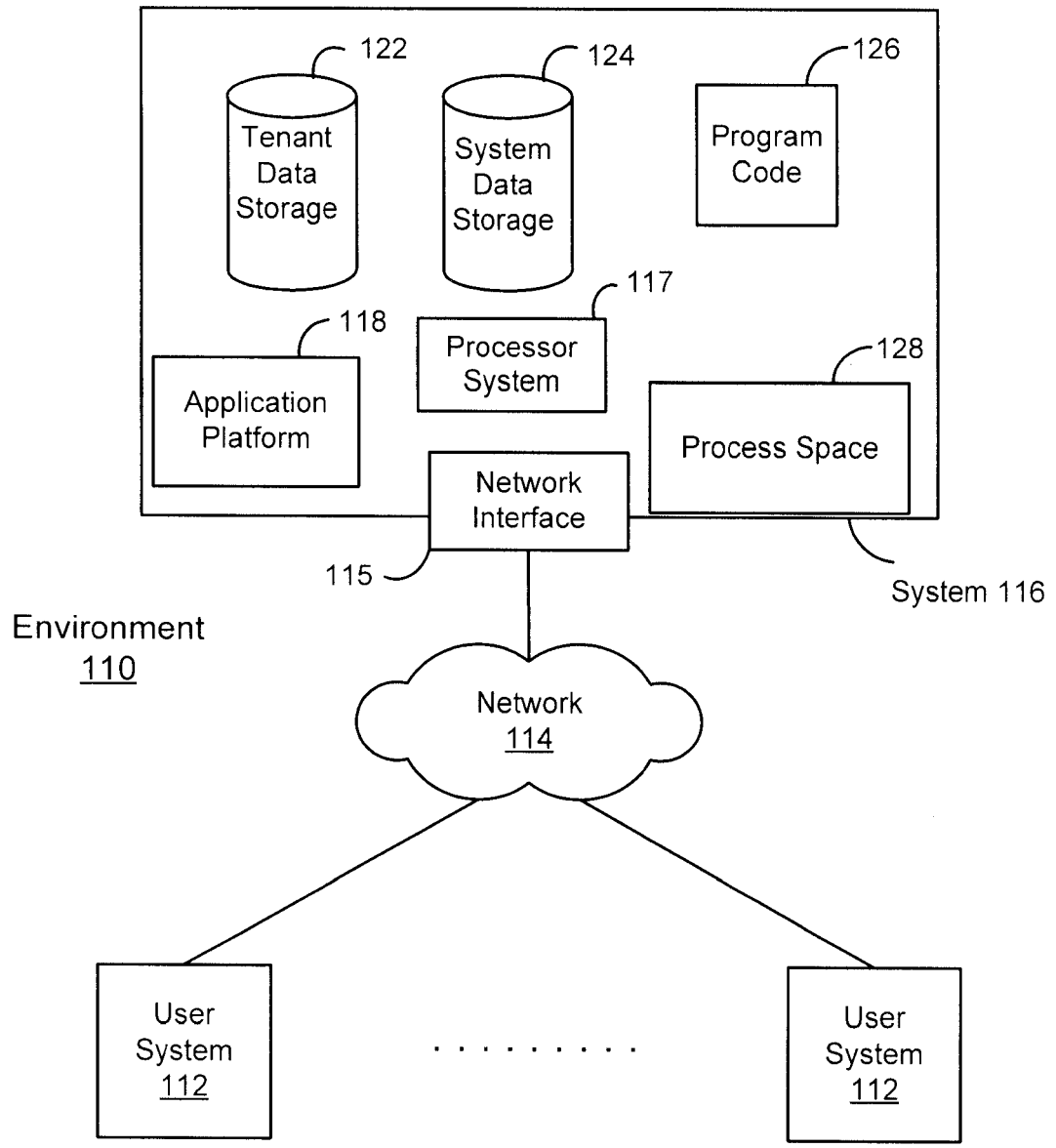
FIG. 10 illustrates a block diagram of an example of an environment wherein an on-demand database service might be used.
Figure 11:
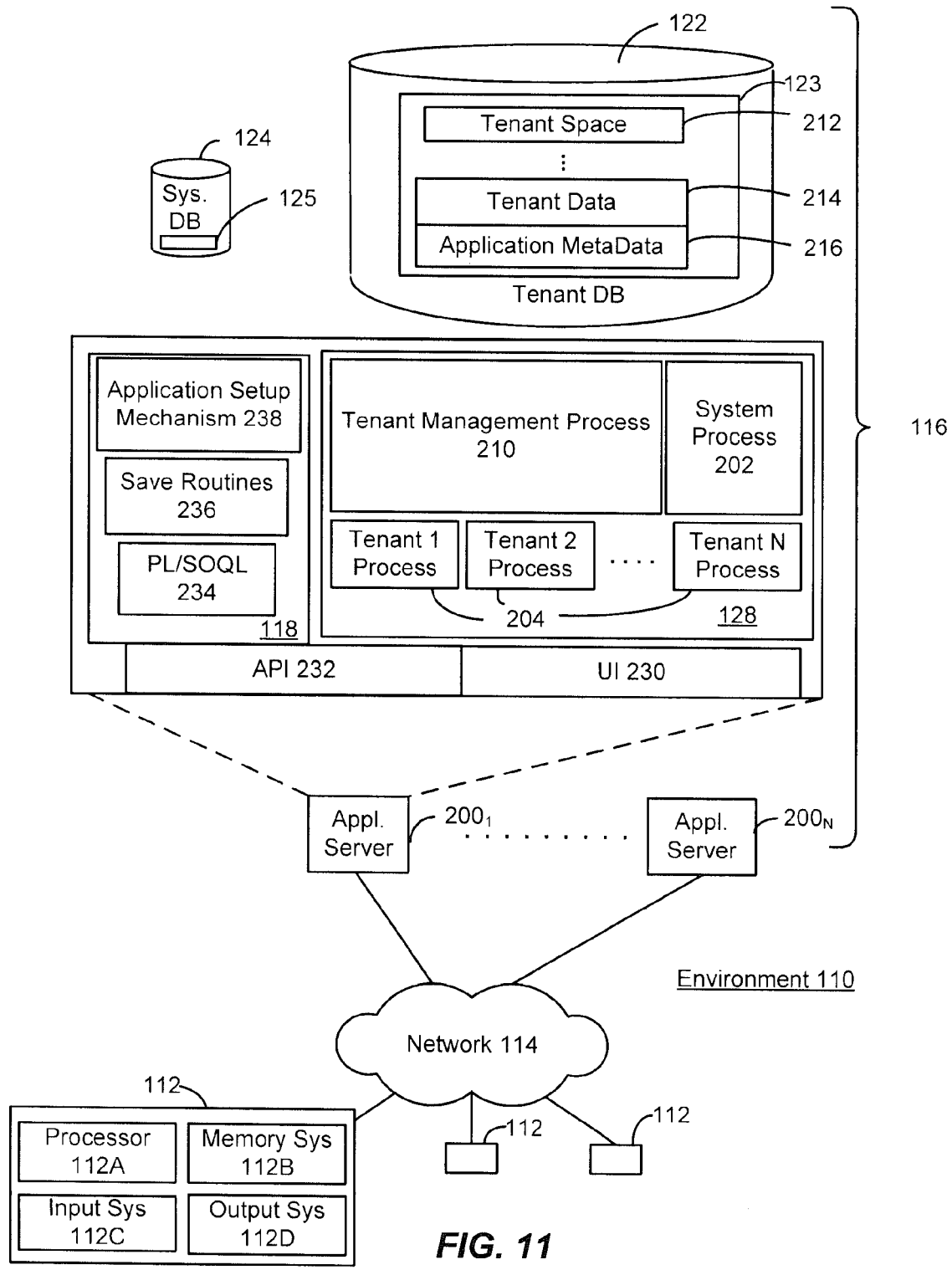
FIG. 11 illustrates a block diagram of an embodiment of elements of FIG. 10 and various possible interconnections between those elements.

In one embodiment, illustrated in FIG. 1A, an on-demand, multi-tenant database system ("MTS") 16 is operating within a computing environment 10, wherein user devices or systems 12 access and communicate with MTS 16 through network 14 in a known manner. (Additional examples for implementing MTS 16 are shown in FIGS. 10-11, described below). As used herein, the term multi-tenant database system refers to those systems in which various elements of hardware and software of the database system may be shared by one or more customers. For example, a given application server may simultaneously process requests for a large number of customers, and a given database table may store rows upon rows of data for an even larger number of customers. As used herein, the term query refers to a set of steps used to access information in a database system.

User devices 12 may be any computing device, such as a desktop computer or a digital cellular telephone, and network 14 may be any type of computing network, such as the Internet, as described in more detail below.

The operation of MTS 16 is controlled by a computer-implemented processor system 17 resident on server 16a, and network interface 15 manages inbound and outbound communications with the network 14 from the MTS. One or more applications 19 are managed and operated by the MTS through application platform 18. For example, a database management application as described herein runs on application platform 18.

MTS 16 provides the users of user systems 12 with managed access to many features and applications, including tenant data storage 22, which is configured through the MTS to maintain tenant data for multiple users/tenants. Tenant data storage 22 may be physically incorporated within MTS 16, or may alternatively be configured as remote storage 22a on server 23 (shown in dashed lines), likewise accessible and useful to the MTS to support user systems 12. There are many types of tenant data that may be maintained in tenant data storage 22, including contact data, i.e., information about an individual, including name, company, address, telephone number, etc.

A distributed memory system 28 is coupled to the MTS server 16a. The distributed memory 28 is comprised of a plurality of memcached storage 30a . . . 30n, and corresponding memcached storage servers 29a . . . 29n. The distributed memory 28 is used to store indexed data structures in a compressed format, and such storage may be permanent and/or temporary. Also, the distributed memory 28 is used for performing database operations as directed by the database manager program, as described in further detail below.

Figure 1B:
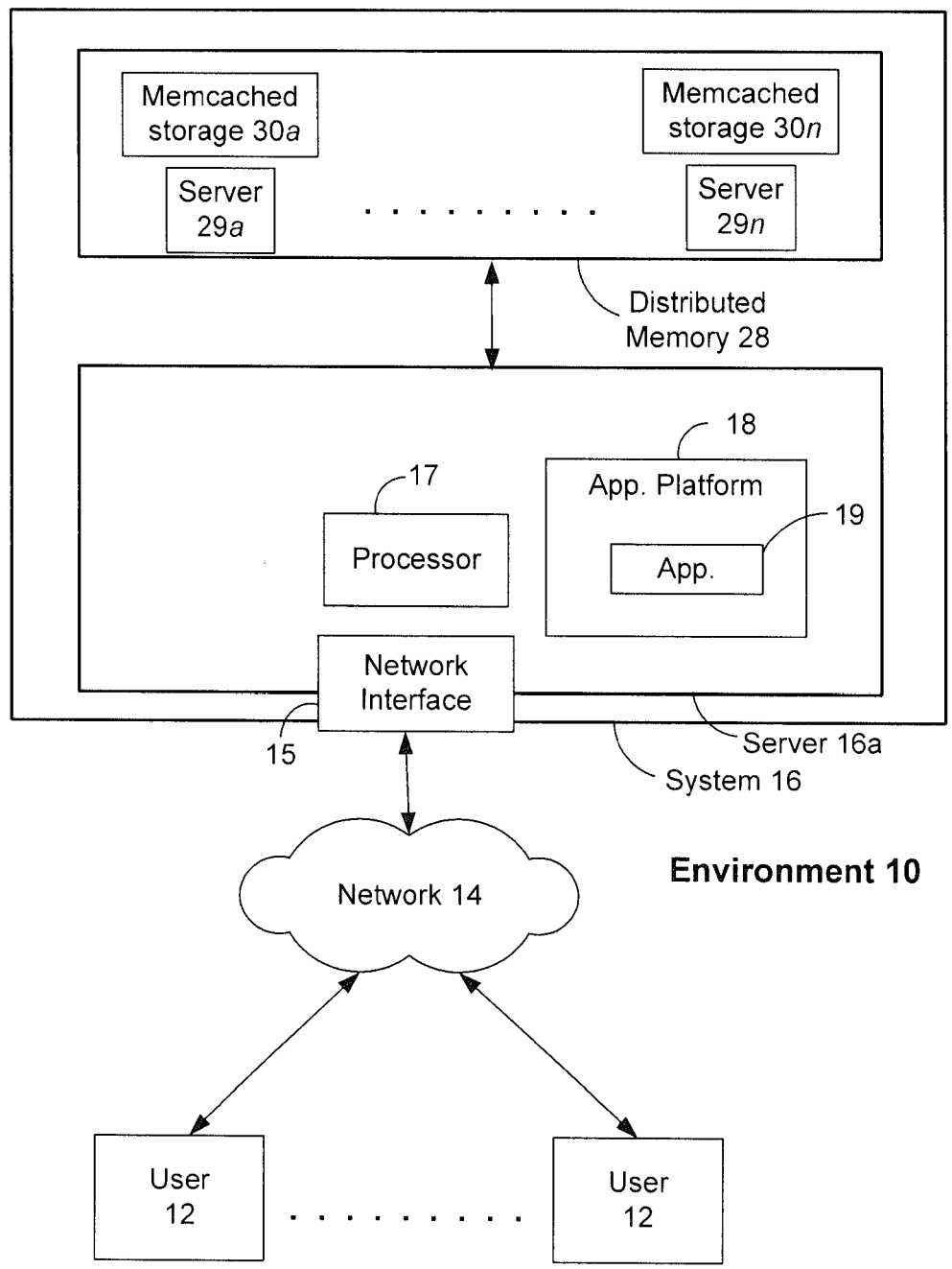
FIG. 1B is a simplified block diagram illustrating an alternative embodiment of an MTS.

In an alternative embodiment, shown in FIG. 1B, the distributed memory system 28 is used as the primary storage for data in MTS 16.

3. Memcached Distributed Memory

Memcached storage is a general purpose distributed memory caching system that is an open source tool, and is horizontally scalable to rather arbitrary lengths. In short, a number of memcached server instances listen on user-defined ports to access spare memory on one or more machines. All the pieces of spare memory thus form a giant hash table that may be distributed across multiple machines. See Fitzpatrick, *Distributed Caching with Memcached,* 124 Linux Journal, August 2004 (linuxjournal.com/article/7451). The latest memcached software release v 1.4.5 is available on the Internet at memcached.org.

Memcached storage provides an attractive alternative to traditional client/server architectures by providing a relatively arbitrary allocation of memory resources to applications, and managing those memory resources in a manner that is invisible to the client. The memory resources available to a memcached storage system may be spread across multiple servers.

4. Compressed Representation and Storage of Sets

In conventional database storage, the data is simply written out in its entirety to a linked list or an array, e.g., in 32-bit chunks. For example, in a Lucene database, the complete data value is stored literally or in an inverted mode. However, some data sets can be quite large, and the resultant impact on both storage requirements and query performance can be significant. Thus, in order to avoid dealing with entire data strings, in one embodiment, the data sets are represented by an identifier stored as a compressed data structure and the compressed representation is given a convenient name, such as INDEX_ID.

In one embodiment, data sets are represented as decreasing integer sets whose elements are k-bit integers (e.g., k=32). One example of a decreasing integer set is (35, 24, 18, 11, 5, 2), i.e., a simple listing of the integers in decreasing order. This is only a small sample set for illustration purposes, but of course there could be millions of such data items, such as listings of contacts and/or customers and/or other information, stored in the database, with access provided and possibly indexed to millions of users. Further, although integer values are shown for the convenience of discussion, the actual values stored and operated with are of course binary, and so storage requirements, both temporary and permanent, may become quite large, and operations using such large items can be cumbersome and therefore should be avoided and/or minimized. By choosing a smaller representation of the data, data operations can be effectively constrained and become more efficient. By storing and operating with these smaller representations in a distributed memory using the memcached model, significant benefits in access time and query response time result.

Figure 2:
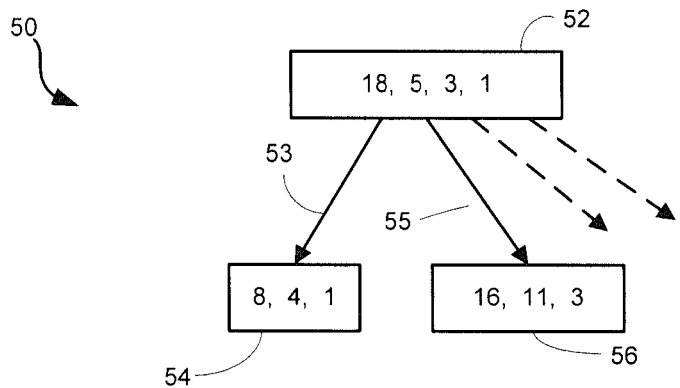
FIG. 2 is a block diagram illustrating a two-level representation of data.

In one embodiment illustrated in FIG. 2, data is represented in memcached storage as a data identifier having linked sets of decreasing integers, stored as a two-level tree structure 50. The top or first level list 52 of decreasing integers (18, 5, 3, 1) are the most significant k/2 bits (MSB) of a first example set of data items. List 54 (8, 4, 1) and list 56 (16, 11, 3) are second or lower level lists of decreasing integers, and are the least significant k/2 bits (LSB) of the first example set of data items. Each list 54, 56 is linked to a single corresponding MSB in list 52. For example, list 54 is linked by link 53 to the value "18" in list 52, and list 56 is linked by link 55 to the value "5" in list 52. Thus, list 54 contains the LSBs for three different data entries each containing the MSB value "18" and list 56 contains the LSBs for four different data entries each containing the MSB value "5." In other words, there are three items having an MSB of 18—one with an LSB of 8, one with an LSB of 4, and one with an LSB of 1, as shown in list 54. Similarly, there are four items having an MSB of 5—one with an LCB of 16, one with an LSB of 13, one with an LSB of 11, and one with an LSB of 3, as shown in list 56.

Each list 52, 54, 55 of decreasing integers is a list of distinct numbers, i.e., there are no duplicates. The MSBs in list 52 are used as the index values to access the data, whether for retrieval or data operations. Advantageously, the second level values are only retrieved when necessary, and the first level index values are initially used in any data operation, as will be discussed in more detail below.

Although a 32-bit example with 16-bit MSB and 16-bit LSB is described, other configurations and divisions could of course be implemented, and the description herein is intended to be illustrative only. Using this example, however, the number of items that can be represented by 16 bits is $2^{16}$-1 or 65,535 items, and therefore the maximum storage requirement for any index data structure is limited to 65,535 unique index values. In contrast, 32 bits can represent over 4 billion items ($2^{32}$-1), and handling 32-bit data presents tremendous difficulty for storage and operations, resulting in unacceptable latency times for both access and query response. By representing the data in a compressed manner, requirements for data handling and storage are constrained to easily manageable sizes, and readily available open source memcached software can handle such data sets easily, giving query results on the order of a few milliseconds.

In the example of FIG. 2, the actual 32 bit values in the data set can be retrieved easily from the data structure 50 by fetching the MSB shown in list 52, shifting it left by 16 bits, then adding the corresponding LSB shown in a second level list to yield the resultant data identifier. This data identifier is used to locate and fetch the actual data. Instructions for this process are easily realized in pseudo code.

Although the logical architecture is limited to 16 bits, the MSBs in the first level lists can be packed two to a 32 bit storage space, and likewise, the LSBs in the second level lists can be packed two to a 32 bit storage space.

One advantage of choosing decreasing integers is that the most recent data, whether it is customer IDs or contact IDs, is typically assigned the highest index number in a database management scheme, so by choosing the MSB as the index value, the most recent entries will reside toward the front of the decreasing integer list, and thus will get retrieved first.

Figure 3:
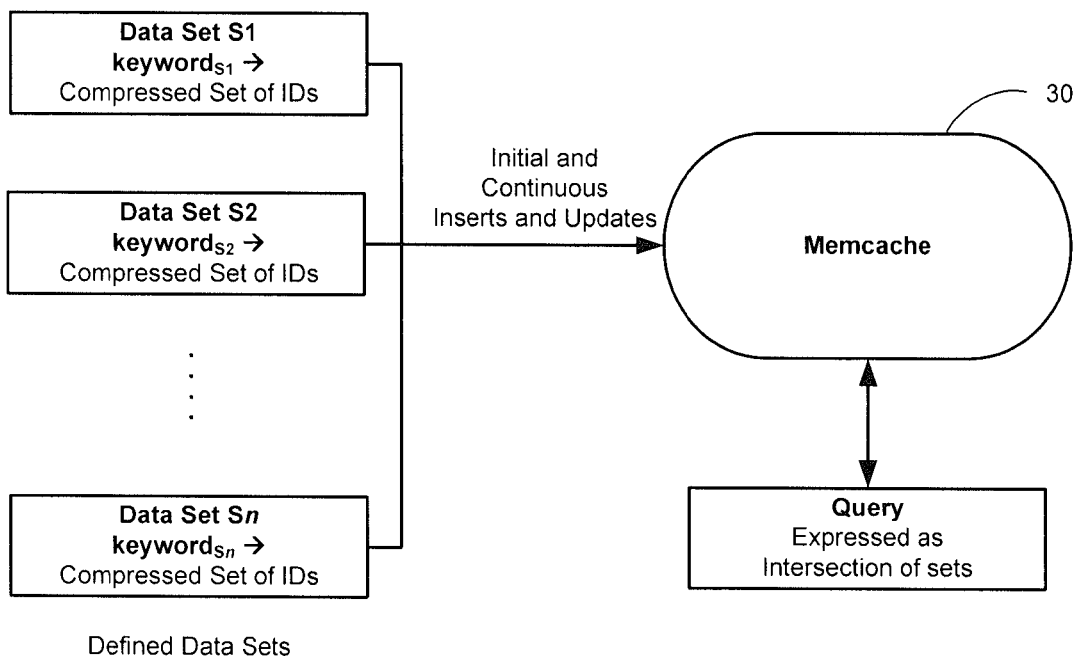
FIG. 3 is a block diagram illustrating the storage of discrete sets of data indices in memcached storage where each set is associated with a specific keyword.

Referring now to FIG. 3, many data sets S1 . . . Sn can be predefined and routinely stored in memcached storage 30 using the two level tree structure described above, and each data set has a keyword or index that enables access to the data set, namely, the first level index value. For example, in a common application, the database stores contact information (such as name, company, title, etc.), and customers may subscribe to the database to purchase and use some or all of the contacts stored in the database. Thus, one predefined data set will be the set of all contacts owned by customer C1, for example. Thus, customer C1 will be assigned a number (the next highest index number in the database), and the top level MSB of the customer number will be the key or index value to access that customer's data, whether to retrieve the data or to use it for various data operations.

Numerous useful data sets can be defined and stored in memcached distributed storage. For example, since the database will routinely keep track of updates, such as which contacts have been updated, and when they were updated, another useful data set might include one listing all contacts updated within some time period (such as the last month, week, day or hour). Other useful data sets can be predefined or formed through a query, such as all contacts having "Vice-President" and "engineering" in the title, or all contacts whose company location (state) is "California," etc. Access to the data sets in memcached distributed storage, whether for retrieval or use in data operations, is very fast, on the order of milliseconds as part of the database, 5. Searches: Intersections of Data Sets A routine query may be expressed as an intersection of data sets, that is, the common elements among the sets, and advantageously, all the data sets are stored in memcached storage as an indexed data structure having the two-level tree representation as described above. For example, customer C1 may want to know which of his contacts have been updated within the last week. This query may be expressed as a simple intersection of all the contacts owned by customer C1 with the contacts that have been updated within the last week.

Such a query may not be insignificant. For example, if customer C1 owns three million contacts, and one hundred thousand have changed in the last week, then using a conventional database intersection technique, each data set would be loaded completely into memory, and then some sort of intersection logic would be applied to these data items. Three million contacts times 32 bits is a lot of data, and just the loading operation requires a tremendous amount of memory, and data operations take some time to complete. For example, a routine index update on a Lucene managed database may take 8-12 hours to complete, and thus it is also routine to expect such tasks to be accomplished overnight rather than in real time. However, through the use of a binary search technique on the indexed data structures stored in memcached storage as described above, query results including index updates may be obtained virtually in real time.

FIGS. 4A and 4B illustrate two data sets 50 and 60 stored as two-level representations in memcached storage. Set 50 is the set of all contacts owned by customer C1 represented as a two level structure in distributed memory, each level having a list of decreasing integers. First level set 52 is a list of decreasing integers for the MSB portions of contacts owned by customer C1. Second level set 56 is a list of decreasing integers for the LSB portions of three items that correspond to and are linked to the single integer value "5" in set 52 on the first level. Thus, there are three distinct data items, each with an MSB portion of "5," and the three items having an LSB portion of "16," "11" and "3" respectively. There are of course other second level sets not shown that are linked to the other MSB values in set 52, and each second level set has at least one value, but may have more than one value, as shown above. Set 60 is the set of all contacts in the database that have been updated within the last week, and is also stored as a two level structure in distributed memory, with lists of decreasing integers. First level set 62 is a list of decreasing integers for the MSB portions of the contacts updated within the last week. Second level set 64 is a list of decreasing integers for the LSB portions of four items that correspond and are linked to the integer value "5" in set 62 on the first level. As before, other second level sets are present and are linked to other MSB values.

It is obvious from a visual inspection of FIGS. 4A and 4B that there is only one data item in the intersection of sets 50 and 60, namely an item with an MSB of "5" and an LSB of "11" and those values are underlined. The following description explains how to obtain that result with reference to FIGS. 5 and 6.

Advantageously, query operations are initially performed only at top level of the two level tree structure. Thus, only the first level data sets will initially be retrieved and stored into memory, and second level sets will be retrieved only when needed.

Figure 6A:
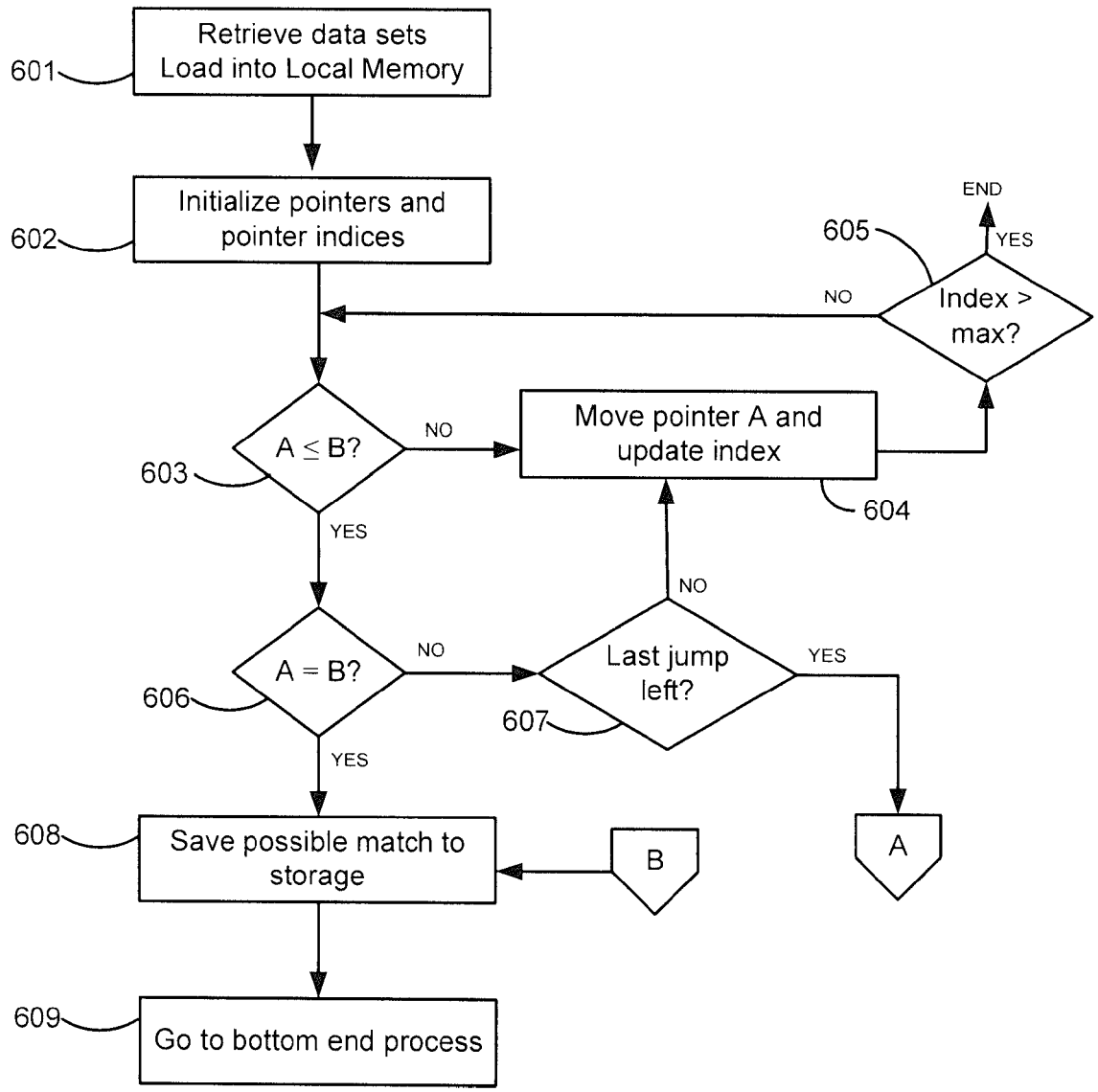
FIGS. 6A and 6B are operational flow diagrams illustrating an embodiment of a process for performing an intersection operation on the data sets of FIGS. 4A and 4B.
Figure 6B:
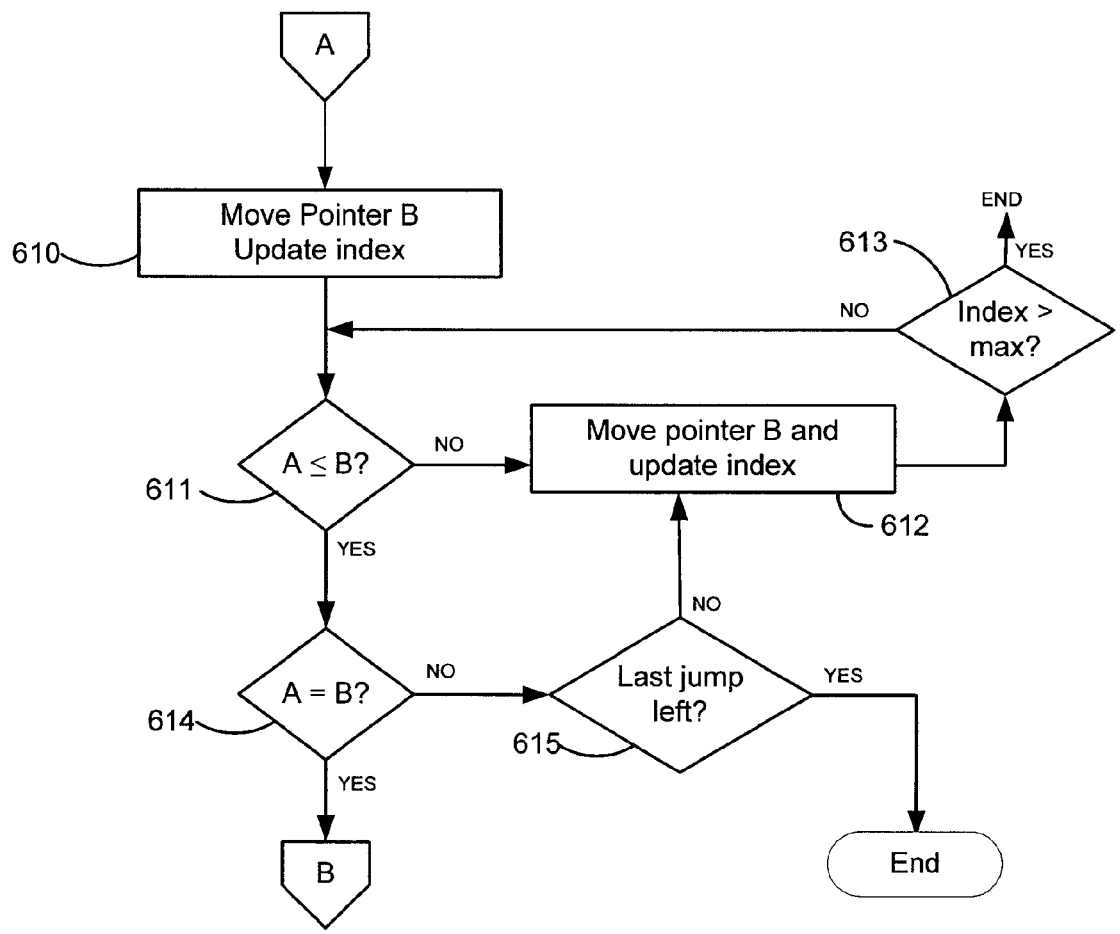

FIGS. 5A through 5E illustrate the use and movement of pointers to help evaluate and compare values from top level set 52 with those of top level set 62. FIGS. 6A and 6B show one embodiment of a process for evaluating and comparing values in the first level sets using the pointers.

In step 601, the two top level sets 52 and 62 are retrieved from memcached storage and placed in local memory. In step 602, the pointers A and B as well as indices for pointers A and B are initialized by having them point to the highest value in sets 52 and 62 respectively (i.e., the left-most value in each decreasing integer set). This position is shown in FIG. 5A, where pointer A points to the value 18 in set 52, and pointer B points to the value 16 in set 62.

In step 603, the value at pointer A in set 52 ("18") is compared to the value at pointer B in set 62 ("16"), and if the A value is less than or equal to the B value, then the A value might be in the intersection. However, that is not true at this point in the example, and that means that the A value is greater than the B value. Further, since the sets are stored as a decreasing integers sets, the A value cannot be in the intersection, and we discard that value and move on. In step 604, pointer A is updated and moved to a new value in set 52 (discussed in more detail below), and an index for pointer A is incremented. In step 605, the pointer A index is compared to a maximum, and if the maximum is exceeded, then this part of the search is done. If the index maximum is not exceeded then the process returns to step 603 for a new comparison.

In a conventional search and compare approach, pointer A might be moved one value to the right of its current value for the next round of comparisons, then one value to the right again, seriatim through the data set. In one embodiment, however, a binary interval reduction technique is used to quickly reduce the search interval in the data set. The objective of the binary search technique for this part of the intersection analysis is to find the largest value in the first data set 52 that is less than or equal to the value at pointer B in set 62. The technique involves moving the pointer back and forth within the set, while reducing the interval to be search, starting from the highest value in the set, then jumping to the lowest value in the set, and then jumping to other integer values within the set that are located halfway into the remaining interval to be searched.

Thus, after the first search and compare, shown in FIG. 5A, pointer A is moved to the low value "1" in set 52, as shown in FIG. 5B, and pointer B remains the same. Returning to step 603, the new value "1" at pointer A is compared to the B value, and now the comparison is true—"1" is less than or equal to "16!" In step 606, the equality of the A value and the B value is considered. Of course, the values are not equal, and that means that the A value is less than the B value, and may or may not be in the intersection, but cannot be excluded for now. That determination is left for later, and this A value is simply ignored for now. In step 607, it is determined whether the last pointer jump was to the left. If not, as in this case, then the process returns to step 604 to move the pointer again and increment the index.

In accord with the binary search technique, pointer A is now moved back to the left, roughly halfway to the prior position of this pointer on the left, pointing to the value "5" as shown in FIG. 5C. Pointer B remains the same. Of course halfway is a relative term, and it is not intended to be exact, since but there are many ways to keep track of the pointer position, and the point here is to reduce the interval by a significant amount for each jump of the pointer. In one embodiment, the binary search technique works by keeping track of the endpoints of the interval being searched, and the halving procedure reduces the length of the interval by half. The procedure stops when a match is found, or when the length of the interval becomes zero. In either event, the index of the last integer searched is returned.

Returning to step 603, the A value is again compared to the B value, and once again the condition is true since "5" is less than or equal to "16." In step 606, the A value is compared to the B value for equality, and again, the values are not equal. In step 607, the last jump was the left, and so the binary technique will move the pointer further to the left, and we have obtained the largest value in set 52 that is less than or equal to the B value.

If an equality is found in step 606, then the MSB values match, and that match will be saved to temporary storage in step 608 as a possible intersection value. In step 609, a bottom level process is initiated to compare data sets 56 and 64.

When step 607 returns a true condition, i.e., the last jump was to the left, then the current A value is a candidate for the intersection, and we initiate a binary search and comparison process of the second top level set 62 to look for a match for the current A value in step 610. The process is similar to that which was performed on the first set, and is illustrated in FIG. 6B. The process starts in step 610 by moving the pointer B from its initial location at the highest value in set 62 to the lowest value, namely "3," and updating the index for pointer B. This position is shown in FIG. 5D.

In step 611, the A value "5" is compared to the B value "3." Since the A value is not less than or equal to the B value, the B value may or may not be in the intersection, but cannot be excluded for now. That determination is left for later, and this B value is ignored for now. In step 612, pointer is moved and it index is incremented. According to the binary search technique, pointer B is now moved to the left halfway toward the previous position of the pointer in that direction. This is shown in FIG. 5E where pointer B points to the value "5" roughly halfway along in the set. Pointer A remains the same. In step 613, the pointer B index is compared to a maximum, and if the maximum is exceeded, then this part of the search is done. If the index maximum is not exceeded, then the process returns to step 611 for a new comparison.

Returning to step 611, the A value "5" is compared to the B value "5," and the condition is true since it is less than or equal. If equality is not found in step 614, then check if the last jump was to the left in step 615. If so, then there are no matches, the intersection is the null set, and the process ends. If the last jump was to the right in step 615, then the process returns to step 612 to move pointer B and update its index.

However, if equality is found in step 614, as here, then there is a match of top level MSBs and the possibility of finding a common LSB value for this matched MSB value. As before, a possible match (e.g., the MSB value "5") is saved to temporary storage in step 608, and a jump to a bottom level process in step 609 will be made to try and find one or more common LSB values for this MSB value.

In another example, suppose that the second set 62 of FIG. 5A remains the same, but the first set 52 were expanded to include "7" namely "18, 7, 5, 3, 1." Since "18" is bigger than "16," the process of FIG. 6A updates the index by reducing the interval to be searched to "7, 5, 3, 1" and moving the A pointer in step 604 to the extreme right, i.e., to the value "1." The process of FIG. 6A is repeated, and since "1" is less than "16," the interval is reduced to "7, 5, 3" and the A pointer is moved to the halfway point of this interval, namely "5." The process of FIG. 6A is again repeated, and since "5" is still less than "16," the interval is reduced to "7" and the A pointer is moved to "7." Although "7" is still less than 16, the interval is now zero and there are no further integers to compare that might be less than or equal to "16." Thus, the first comparison process ends and returns the integer last pointed to by pointer A, namely "7" as the largest integer in set 52 that is less than or equal to "16" in set 62.

The process for evaluating the bottom level LSBs in sets 56 and 64 is identical to the top level process shown in FIGS. 6A and 6B, and thus will not be repeated, except that when an equality is found (for example, in steps 606 of FIG. 6A or step 614 of FIG. 6B), the matching LSB value and corresponding MSB from the top level process are immediately stored as an element of the intersection set with a two-level representation in memcached storage.

When the second level compare operation is completed, the process returns to the first level and looks for more matches using the processes shown in FIGS. 6A and 6B. Pointer A is re-initialized by moving to the right by one value from the prior initialization. However, if the value to the right has already been found to be in the intersection, as in this case, then the pointer A is indexed again to the right by one value in set 52. In the example of FIG. 4A and 4B, this will set pointer A to the value "3." One can see that the binary search technique will quickly move from set 52 to set 62 and find that the value "3" is another top level MSB match, and another bottom level search will start at that point to look for a common LSB for the MSB value "3."

Advantageously, when more than two data sets must be intersected, the two sets having the fewest data elements are intersected first, and this result is then intersected with the next set having the fewest data elements, etc. This is a logical approach to further simplifying computational needs.

6. Searches: Unions of Data Sets

Another common data operation is a union of data sets. Most commonly, a union operation is used to add new data to an existing set of data, for example, when customer C1 purchases a batch of new contacts, they must be added to the existing set of contacts. This scenario is depicted in FIG. 7, where new list T1 (data set 50) is to be added to the existing list Si (data set 60) already stored in memcached storage for customer C1.

New list T1 is built as a two layer tree representation as described above and stored in local memory as the user prepares the list T1. New list T1 includes the MSB set 52, and each MSB in set 52 is linked to at least one LSB set, such as LSB set 56 which is linked to MSB value "5." Existing list S1 resides in memcached storage, and includes MSB set 62, and each MSB in set 52 is linked to at least one LSB set, such as LSB set 56 which is linked to MSB value "5". A union operation is performed between new list T1 and existing list S1 and the result causes updates in the memcached storage.

Figure 9A:
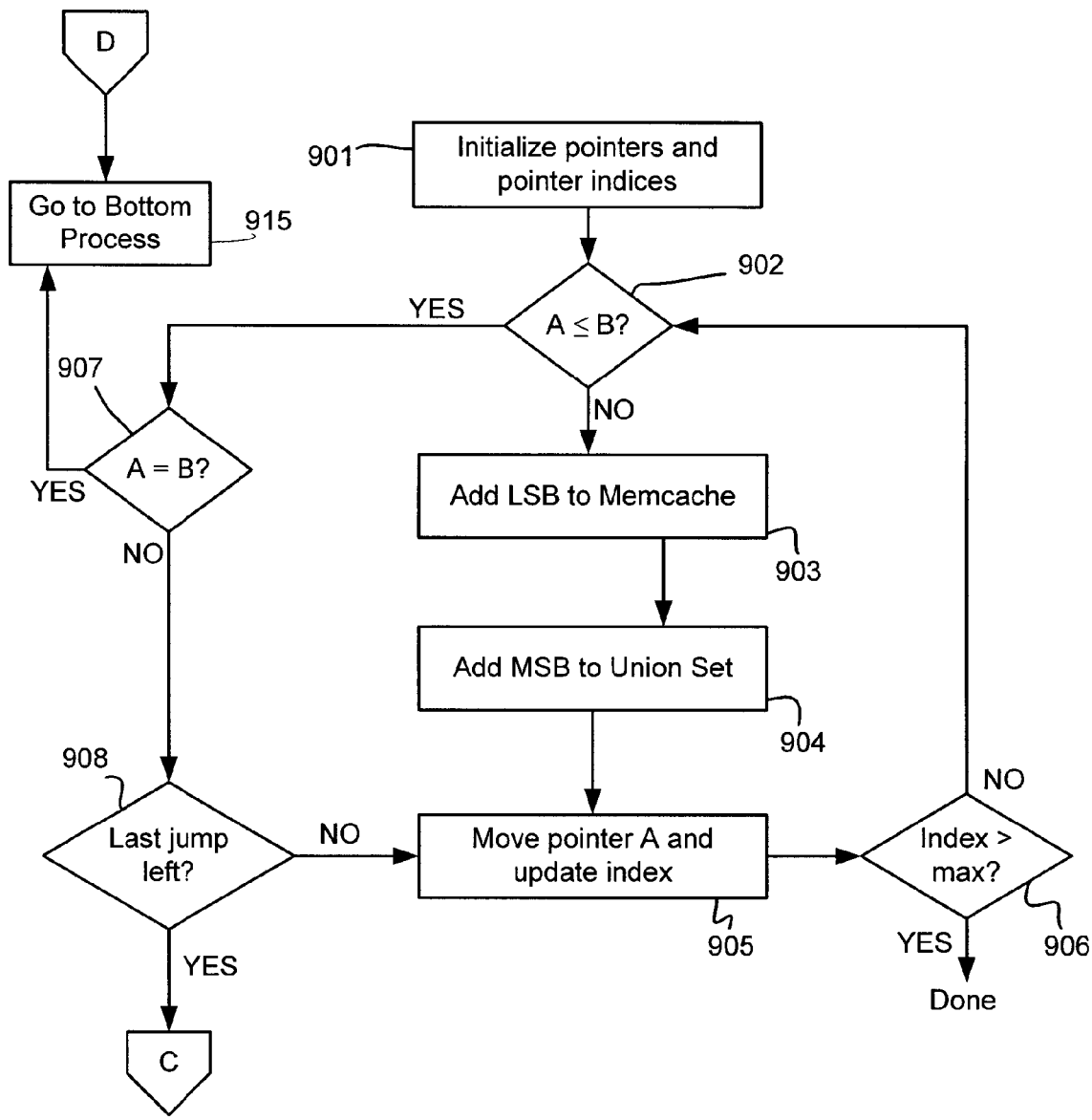
FIGS. 9A and 9B are operational flow diagrams illustrating an embodiment of a process for performing an union operation on the data sets of FIGS. 7A and 7B.

The technique for performing the union operation is similar in principle and structure to the intersection operation, and relies on the binary search technique to achieve fast results. The process is shown in FIG. 9, and the use of pointers is illustrated in FIG. 8.

In step 901, the pointers A and B as well as indices for pointers A and B are initialized by having them point to the highest value in sets 52 and 62 respectively (i.e., the left-most value in each decreasing integer set). This position is shown in FIG. 8A, where pointer A points to the value 18 in set 52, and pointer B points to the value 16 in set 62. In step 902, the A value is compared to the B value. If the A value is not less than or equal to the B value, as in this first example, then all the LSB values in set 51 corresponding to the MSB value "18" in are immediately loaded from local memory into memcached storage in step 903. Further, the MSB value is placed in temporary storage in step 904 until the process is complete, at which time this value will be added to set 62. In step 905, pointer A is moved and its index updated. In step 906, the index is compared to its maximum value, and if exceeded, the process is done; if not, the process returns to step 902 for further comparison and binary search.

Thus, in accord with the binary search technique, pointer A is moved from the highest value to the lowest value "1" in set 52, as shown in FIG. 8B. In step 902, the comparison of the A value to the B value yields a true result, i.e., the A value "1" is less than the B value "16." In step 907, the equality of the A value and B value is evaluated, which in this case is not true. Thus, we may or may not need to add this MSB value to the union set, but that decision will considered later. In step 908, check to see if the last pointer jump was to the left. If so, then the pointer has moved as far as it can in the binary search technique, and the process jumps to FIG. 9B to perform the binary search and compare against the second data set 62. If the last pointer jump was not to the left, then the process returns to step 905 to move the pointer and return for more comparisons.

Pointer A is now moved back to the left, halfway toward the previous pointer location on the left, to the value "5" as shown in FIG. 8C. In step 902, the comparison of the A value to the B value again yields a true result, i.e., the A value "5" is less than the B value "16." In step 907, the equality of the A value and B value is evaluated, which in this case is not true. Thus, we may or may not need to add this MSB value to the union set, but that decision will considered later. In step 908, check to see if the last pointer jump was to the left. It was, so pointer A has moved as far as it can in the binary search technique, and the process jumps to FIG. 9B to perform the binary search and compare against the second data set 62, described below.

If there was an equality in step 907, then the MSB value is already in the existing set S1, but there may be additional LSB values in new set T1 that need to be added to set S1. Thus, step 915 jumps to a bottom level process to determine the union set for LSBs of the MSB value "5." In the bottom level process, sets 56 and 64 are evaluated by the same binary search technique to find the LSB values in set 56 that are not already in set 64. Those values are then formed as a resultant union set and loaded into memcache to replace set 64.

Figure 9B:
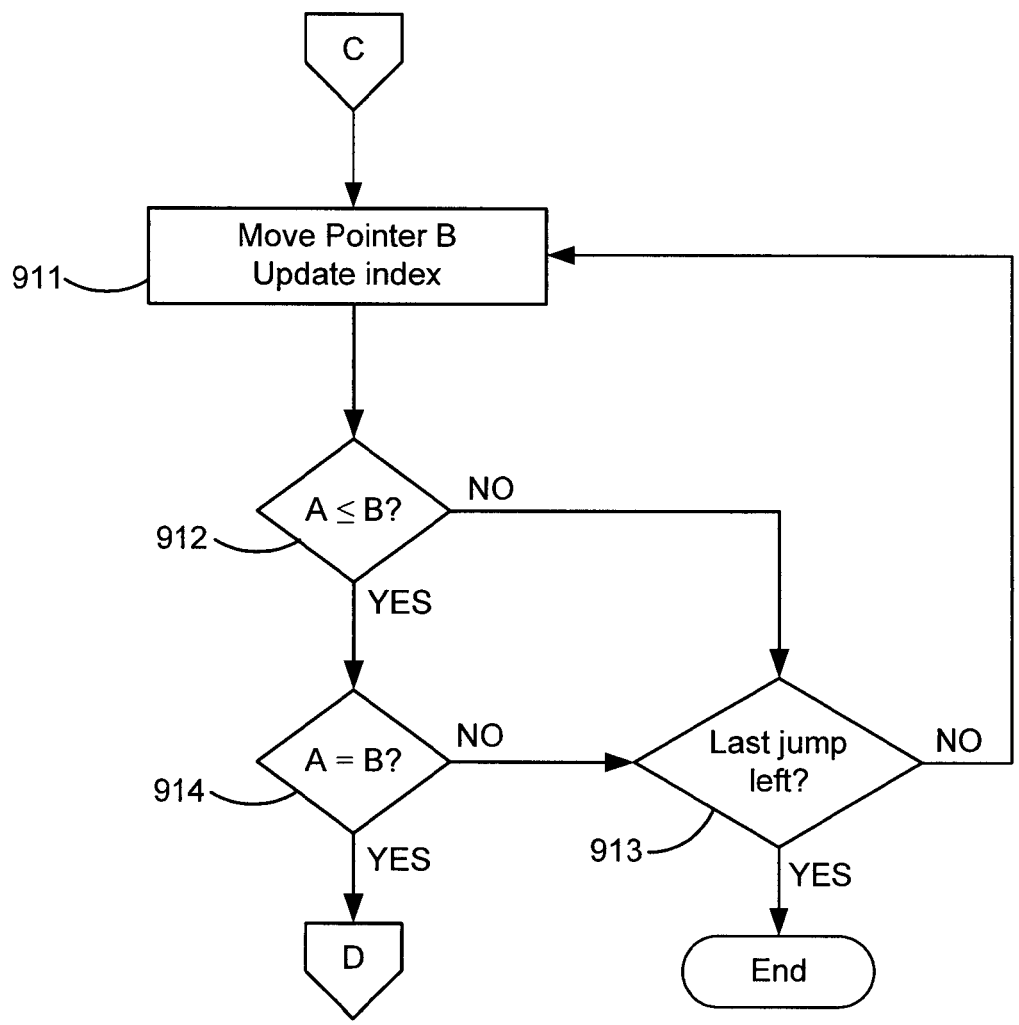

Referring now to FIG. 9B, in step 911, pointer B is moved and its index is updated. According to the binary search technique, pointer B is moved to the right from the highest value in set 62 to the lowest value "3" as shown in FIG. 8D. In step 912, the comparison of the A value to the B value is not true, i.e., the A value "5" is not less than the B value "3." Thus, the MSB value "5" may or may not need to be added to the union set, but that decision is deferred until later. In step 913, check to see if the last pointer jump was to the left. If so, then the pointer has moved as far as it can in the binary search technique, and this process ends. If the last pointer jump was not to the left, as here, then the process returns to step 911 to move the pointer and return for more comparisons.

According to the binary search technique, pointer B is now moved to the left, halfway toward the previous position on the left, pointing to the value "5" as shown in FIG. 8E. Returning to step 911, the comparison step of the A value to the B value now is true since "5" is less than or equal to "5," and in step 914, the A value equals the B value. This means that the MSB value "5" is already in the existing set S1, but there may be additional LSB values in new set T1 that need to be added to set S1. Thus, step 915 jumps to a bottom level process to determine the union set for LSBs of the MSB value "5." In the bottom level process, sets 56 and 64 are evaluated by the same binary search technique to find the LSB values in set 56 that are not already in set 64. Those values are then formed as a resultant union set and loaded into memcache to replace set 64.

If in step 914 the values were not equal, then last jump left is checked in step 913, then the process returns to step 911 to move the pointer and make more comparisons.

7. Powerful Parallel Processing

One additional benefit of the use of the data structure with memcached storage is extraordinary parallel processing capability. Consider the scenario where thousands of subscribers are making queries to the database simultaneously. Because of the distributed nature of memcached storage, there is generally little overlap in such queries, and results can be obtained very quickly.

8. Detailed System Overview

FIG. 10 is a block diagram of an exemplary environment 110 wherein an on-demand database service might be used. Environment 110 may include user systems 112, network 114 and system 116. Further, the system 116 can include processor system 117, application platform 118, network interface 115, tenant data storage 122, system data storage 124, program code 126 and process space 128. In other embodiments, environment 110 may not have all of the components listed and/or may have other elements instead of, or in addition to, those listed above.

Environment 110 is an environment in which an on-demand database service 116 exists. User system 112 may be any machine or system that is used by a user to access a database user system. For example, any of user systems 112 can be a handheld computing device, a mobile phone, a laptop computer, a work station, and/or a network of computing devices. As illustrated in FIG. 10 (and in more detail in FIG. 11), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 10, including a network interface 115, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 10 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as the INTERNET EXPLORER ® browser, the NAVIGATOR ® browser, the OPERA ® browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 11 also illustrates environment 110. However, in FIG. 11 elements of system 116 and various interconnections in an embodiment are further illustrated. FIG. 11 shows that user system 112 may include processor system 112A, memory system 112B, input system 112C, and output system 112D. FIG. 11 shows network 114 and system 116. FIG. 11 also shows that system 116 may include tenant data storage 122, tenant data 123, system data storage 124, system data 125, User Interface (UI) 130, Application Program Interface (API) 132, PL/SOQL 134, save routines 136, application setup mechanism 138, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 10. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown by FIG. 11, system 116 may include a network interface 115 (of FIG. 10) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in commonly owned co-pending U.S. Provisional Patent Application 60/828,192, entitled Programming Language Method And System For Extending APIs To Execute In Conjunction With Database APIs, filed Oct. 4, 2006, which is incorporated in its entirety herein for all purposes. Invocations to applications may be detected by one or more system processes, which manage retrieving application metadata 216 for the subscriber making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, wherein system 116 handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "Custom Entities and Fields in a Multi-Tenant Database System," and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for efficient handling of contacts stored in a database apparatus, comprising:
   storing each of a plurality of contact identifiers in a distributed memory apparatus as a two-level indexed data structure, wherein a first level of each data structure includes a first unique set of decreasing integers, wherein a second level of the data structure includes a plurality of unique sets of decreasing integers, wherein each of the plurality of unique sets is linked to one of the integers in the first unique set, wherein each integer in the first unique set represents a first portion of the contact identifier and each integer in the plurality of unique sets represents a second portion of the contact identifier;
   performing a query operation using the contact identifiers to locate one or more contacts having selected attributes and storing the result of the query operation in the distributed memory as a resultant two-level data structure, the query operation finding a union set between a first data structure representing a first set of desired contact attributes and a second data structure representing a second set of desired contact attributes by performing a first series of comparison operations between the first level integer sets of the first and second data structures to identify matched and unmatched integers in the first level of the first and second data structures;
   if a first integer of the first level of the first data structure is not found in the first level of the second data structure, retrieving the unique set of second level integers that is linked to the first integer and storing the unique set of second level integers in the second level of an indexed data structure, and adding the first integer to the union set;
   if a matched integer is identified in the first level integer sets, performing a second series of comparison operations between the second level integer sets of the first and second data structures to identify matched and unmatched integers in the second level integer sets of the first and second data structures, and storing the matched and unmatched integers in the second level of the second data structure with a link to the matched integer in the first level of the second data structure; and
   repeating the steps of performing the first and second series of comparison operations until done.

2. The method of claim 1, wherein the first portion of the contact identifier is a most significant bits portion and the second portion of the contact identifier is a least significant bits portion.

3. The method of claim 1, wherein a plurality of query operations are performed in parallel using the distributed memory.

4. The method of claim 1, further comprising:
   shifting the first level of the resultant two-level data structure to the left by a specified number of bits and then adding the second level of the resultant two-level data structure thereby obtaining a resultant contact identifier;
   locating and retrieving the actual contact data corresponding to the resultant contact identifier; and
   returning the actual contact data to a user.

5. The method of claim 1, wherein the distributed memory apparatus comprises memcached storage.

6. The method of claim 1, further comprising performing the first series of comparison operations and the second series of comparison using a binary interval reduction process.

7. The method of claim 6, wherein the first series of comparison steps comprises:
   a first comparison step for comparing a plurality of the first level integers of the first data structure to a single integer of the first level integers of the second data structure; and
   a second comparison step for comparing a plurality of the first level integers of the second data structure to a single integer of the first level integers of the first data structure.

8. The method of claim 7, wherein the first comparison step comprises:
   initializing a first pointer and a second pointer to point to the highest integer value in the first level integer sets of the first and second data structures, respectively;
   comparing in a first step the value at the first pointer to the value at the second pointer;
      if the value at the first pointer is greater than the value at the second pointer, then retrieving the unique set of integers that is linked to the value at the first pointer, storing the unique set of integers in the second level of an indexed data structure, and adding the value at the first pointer to the union set;
      moving the first pointer in accord with the binary interval reduction process and returning to the first step;
      if the value at the first pointer is less than the value at the second pointer, then moving the second pointer in accord with the binary interval reduction process and returning to the first step, unless the last move of the second pointer was to the left, and if so, then performing the second comparison step; and
      if the value at the first pointer is equal to the value at the second pointer, then performing the second series of comparison operations.

9. The method of claim 7, wherein the second comparison step comprises:
   moving the second pointer in accord with the binary interval reduction process,
   comparing in a second step the value at the first pointer to the value at the second pointer;
      if the value at the first pointer is greater than the value at the second pointer, then moving the first pointer in accord with the binary interval reduction process and returning to the second step, unless the last move of the first pointer was to the left, and if so, then ending the process;
      if the value at the first pointer is less than the value at the second pointer, then moving the second pointer in accord with the binary interval reduction process and returning to the second step, unless the last move of the second pointer was to the left, and if so, then ending the process; and
      if the value at the first pointer is equal to the value at the second pointer, then performing the second series of comparison operations.

10. The method of claim 6, wherein the second series of comparison steps comprises:

a third comparison step for comparing a plurality of the second level integers of the first data structure to a single integer of the second level integers of the second data structure; and a fourth comparison step for comparing a plurality of the second level integers of the second data structure to a single integer of the second level integers of the first data structure.

11. The method of claim 10, wherein the fourth comparison step comprises:

moving the fourth pointer in accord with the binary interval reduction process, comparing in a fourth step the value at the third pointer to the value at the fourth pointer;

if the value at the third pointer is greater than the value at the fourth pointer, then moving the third pointer in accord with the binary interval reduction process and returning to the second step;

if the value at the third pointer is less than the value at the fourth pointer, then moving the fourth pointer in accord with the binary interval reduction process and returning to the second step, unless the last move of the fourth pointer was to the left, and if so, then end the process; and if the value at the third pointer is equal to the value at the fourth pointer, then saving and storing the matched integer value at the first and second pointers together with the matched integer value at the third and fourth pointers in a two level representation in the distributed memory, and incrementing a first index value and a second index value, then moving the first pointer to the integer value indicated by the first index value and moving the second pointer to the integer value indicated by the second index value; and returning to the first series of comparison operations.

12. The method of claim 10, wherein the third comparison step comprises:

initializing a third pointer and a fourth pointer to point to the highest integer value in the second levels of the first data structure and the second data structure, respectively;

comparing in a third comparison step the value at the third pointer to the value at the fourth pointer;

if the value at the third pointer is greater than the value at the fourth pointer, then moving the third pointer in accord with the binary interval reduction process and returning to the third comparison step;

if the value at the third pointer is less than the value at the fourth pointer, then moving the fourth pointer in accord with the binary interval reduction process and returning to the first comparison step, unless the last move of the fourth pointer was to the left, and if so, then ending the process; and if the value at the third pointer is equal to the value at the fourth pointer, then saving and storing the matched integer value at the first and second pointers together with the matched integer value at the third and fourth pointers in a two level representation in the distributed memory, and incrementing a first index value and a second index value, then moving the first pointer to the integer value indicated by the first index value and moving the second pointer to the integer value indicated by the second index value; and returning to the first series of comparison operations.

13. A method for efficient handling of contacts stored in a database apparatus, comprising:

storing each of a plurality of contact identifiers in a distributed memory apparatus as a two-level indexed data structure, a first level of each data structure includes a first unique set of decreasing integers, a second level of the data structure includes a plurality of unique sets of decreasing integers, each of the plurality of unique sets is linked to one of the integers in the first unique set, each integer in the first unique set represents a first portion of the contact identifier and each integer in the plurality of unique sets represents a second portion of the contact identifier;

performing a query operation using the contact identifiers to locate one or more contacts having selected attributes and storing the result of the query operation in the distributed memory as a resultant two-level data structure, the query operation finding an intersection set between a first data structure representing a first set of desired contact attributes and a second data structure representing a second set of desired contact attributes by performing a first series of comparison operations between the first level integer sets of the first and second data structures to identify a first matching integer in the first level integer sets, the first series of comparison steps including a first comparison step for comparing a plurality of the first level integers of the first data structure to a single integer of the first level integers of the second data structure and a second comparison step for comparing a plurality of the first level integers of the second data structure to a single integer of the first level integers of the first data structure;

if a first matching integer is identified in the first level integer sets, performing a second series of comparison operations between the second level integer sets of the first and second data structures that are linked to the first matching integer in the first level integer sets to identify at least one second matching integer in the second level integer sets of the first and second data structures;

if at least one second matching integer is identified in the second level integer sets, storing in the distributed memory the first and second matching integers as an intersection set having the indexed data structure; and repeating the steps of performing the first and second series of comparison operations until done.

14. The method of claim 13, further comprising performing the first series of comparison operations and the second series of comparison using a binary interval reduction process.

15. The method of claim 14, wherein the first comparison step comprises:

initializing a first pointer and a second pointer to point to the highest integer value in the first level integer sets of the first and second data structures, respectively;

comparing in a first step the value at the first pointer to the value at the second pointer;

if the value at the first pointer is greater than the value at the second pointer, then moving the first pointer in accord with the binary interval reduction process and returning to the first step;

if the value at the first pointer is less than the value at the second pointer, then moving the second pointer in accord with the binary interval reduction process and returning to the first step, unless the last move of the first pointer was to the left, and if so, then performing the second comparison step; and if the value at the first pointer is equal to the value at the second pointer, then performing the second series of comparison operations.

16. The method of claim 14, wherein the second comparison step comprises:
moving the second pointer in accord with the binary interval reduction process, comparing in a second step the value at the first pointer to the value at the second pointer;
if the value at the first pointer is greater than the value at the second pointer, then moving the second pointer in accord with the binary interval reduction process and returning to the second step;
if the value at the first pointer is less than the value at the second pointer, then moving the second pointer in accord with the binary interval reduction process and returning to the second step, unless the last move of the second pointer was to the left, and if so, then ending the process; and
if the value at the first pointer is equal to the value at the second pointer, then performing the second series of comparison operations.

17. The method of claim 14, wherein the second series of comparison steps comprises:
a third comparison step for comparing a plurality of the second level integers of the first data structure to a single integer of the second level integers of the second data structure; and
a fourth comparison step for comparing a plurality of the second level integers of the second data structure to a single integer of the second level integers of the first data structure.

18. The method of claim 17, wherein the third comparison step comprises:
initializing a third pointer and a fourth pointer to point to the highest integer value in the second level integer sets of the first data structure and the second data structure, respectively;
comparing in a third step the value at the third pointer to the value at the fourth pointer;
if the value at the third pointer is greater than the value at the fourth pointer, then moving the third pointer in accord with the binary interval reduction process and returning to the third step;
if the value at the third pointer is less than the value at the fourth pointer, then moving the fourth pointer in accord with the binary interval reduction process and returning to the first step, unless the last move of the fourth pointer was to the left, and if so, then ending the process;
if the value at the third pointer is equal to the value at the fourth pointer, then saving and storing the matched integer value at the first and second pointers together with the matched integer value at the third and fourth pointers in a two level representation in the distributed memory, incrementing a first index value and a second index value, then moving the first pointer to the integer value indicated by the first index value and moving the second pointer to the integer value indicated by the second index value; and
returning to the first series of comparison operations.

19. The method of claim 17, wherein the fourth comparison step comprises:
moving the fourth pointer in accord with the binary interval reduction process, comparing in a fourth step the value at the third pointer to the value at the fourth pointer;
if the value at the third pointer is greater than the value at the fourth pointer, then moving the third pointer in accord with the binary interval reduction process and return to the second step;
if the value at the third pointer is less than the value at the fourth pointer, then moving the fourth pointer in accord with the binary interval reduction process and returning to the second step, unless the last move of the fourth pointer was to the left, and if so, then end the process; and
if the value at the third pointer is equal to the value at the fourth pointer, then saving and storing the matched integer value at the first and second pointers together with the matched integer value at the third and fourth pointers in a two level representation in the distributed memory, incrementing a first index value and a second index value, then moving the first pointer to the integer value indicated by the first index value and moving the second pointer to the integer value indicated by the second index value; and
returning to the first series of comparison operations.

20. The method of claim 14, wherein the binary interval reduction process comprises:
in a first move, moving the relevant pointer to the right from a highest integer value to a lower integer value; and
in subsequent moves, reducing the search interval, then moving the relevant pointer to the halfway point of the reduced interval.

21. The method of claim 13, wherein the first portion of the contact identifier is a most significant bits portion and the second portion of the contact identifier is a least significant bits portion.

22. The method of claim 13, wherein a plurality of query operations are performed in parallel using the distributed memory.

23. The method of claim 13, further comprising:
shifting the first level of the resultant two-level data structure to the left by a specified number of bits and then adding the second level of the resultant two-level data structure thereby obtaining a resultant contact identifier;
locating and retrieving the actual contact data corresponding to the resultant contact identifier; and
returning the actual contact data to a user.

24. The method of claim 13, wherein the distributed memory apparatus comprises memcached storage.

25. A machine-readable medium having one or more sequences of instructions for performing a database search for desired contact attributes, which instructions, when executed by one or more processors, cause the one or more processors to:
store each of a plurality of contact identifiers in a distributed memory apparatus as a two-level indexed data structure, wherein a first level of each data structure includes a first unique set of decreasing integers, wherein a second level of each data structure includes a plurality of unique sets of decreasing integers, wherein each of the plurality of unique sets is linked to one of the integers in the first unique set, wherein each integer in the first unique set represents a first portion of the contact identifier and each integer in the plurality of unique sets represent a second portion of the contact identifier;
perform a query operation for desired contact attributes using the contact identifiers and storing the result in the distributed memory as a resultant two-level data structure, the query operation finding a union set between a first data structure representing a first contact attribute and a second data structure representing a second contact attribute by performing a first series of comparison operations between the first level of the first data structure and the first level of the second data structure to identify matched and unmatched integers in the first level of the first and second data structures;

if a first integer in the first level of the first data structure is not found in the first level of the second data structure, then retrieve the unique set of integers that is linked to the first integer and store the unique set of integers in the second level of an indexed data structure, and add the first integer to the union set, and if a matched integer is identified in the first level of the first and second data structures, then perform a second series of comparison operations between the second level of the first data structure and the second level of the second data structure to identify matched and unmatched integers in the second level of the first data structures, and store the matched and unmatched integers in the second level of the second data structure with a link to the matched integer in the first level of the second data structure; and repeat the steps of performing the first and second series of comparison operations until done.

26. A machine-readable medium having one or more sequences of instructions for performing a database search for desired contact attributes, which instructions, when executed by one or more processors, cause the one or more processors to:

store each of a plurality of contact identifiers in a distributed memory apparatus as a two-level indexed data structure, wherein a first level of each data structure includes a first unique set of decreasing integers, wherein a second level of each data structure includes a plurality of unique sets of decreasing integers, wherein each of the plurality of unique sets is linked to one of the integers in the first unique set, wherein each integer in the first unique set represents a first portion of the contact identifier and each integer in the plurality of unique sets represent a second portion of the contact identifier;

perform a query operation for desired contact attributes using the contact identifiers and storing the result in the distributed memory as a resultant two-level data structure, the query operation finding an intersection set between a first data structure representing a first contact attribute and a second data structure representing a second contact attribute by performing a first series of comparison operations between the first level of the first data structure and the first level of the second data structure process to identify a first matching integer in the first level of the first and second data structures;

when a first matching integer is identified in the first level of the first and second data structures, perform a second series of comparison operations between the second level of the first data structure that is linked to the first matching integer and the second level of the second data structure that is linked to the first matching integer to identify a second matching integer in the second level of the first and second data structures;

when a second matching integer is identified in the second level of the first and second data structures, store the first and second integer as an intersection set; and repeat the steps of performing the first and second series of comparison operations until done.

27. An apparatus for managing contact data, comprising:
a database having a plurality of contact data records stored therein;

a database manager program having executable instructions for managing storage, indexing and retrieval of the contact data records, including first and second instructions;

a distributed memory system accessible to the database and operable in accord with the first instructions of the database manager program, said first instructions for:

storing each of a plurality of contact identifiers in the distributed memory apparatus as a two-level indexed data structure, wherein a first level of each data structure includes a first unique set of decreasing integers, wherein a second level of each data structure includes a plurality of unique sets of decreasing integers, wherein each of the plurality of unique sets is linked to one of the integers in the first unique set, wherein each integer in the first unique set represents a first portion of the contact identifier and each integer in the plurality of unique sets represent a second portion of the contact identifier;

a search interface in communication with the database manager program and operable in accord with second instructions, said second instructions for performing query operations on the contact data records using the indexed data structures to find an intersection set between a first data structure representing a first contact attribute and a second data structure representing a second contact attribute by performing a first series of comparison operations between a first level of a first data structure and a first level of a second data structure to identify a first matching integer in the first level of the first and second data structures;

when a first matching integer is identified in the first level of the first and second data structures, performing a second series of comparison operations between the second level of the first data structure that is linked to the first matching integer and the second level of the second data structure that is linked to the first matching integer to identify a second matching integer in the second level of the first and second data structures;

when a second matching integer is identified in the second level of the first and second data structures, storing the first and second integer as an intersection set; and repeating the steps of performing the first and second series of comparison operations until done.

28. An apparatus for managing contact data, comprising:
a database having a plurality of contact data records stored therein;

a database manager program having executable instructions for managing storage, indexing and retrieval of the contact data records, including first and second instructions;

a distributed memory system accessible to the database and operable in accord with the first instructions of the database manager program, said first instructions for:

storing each of a plurality of contact identifiers in the distributed memory apparatus as a two-level indexed data structure, wherein a first level of each data structure includes a first unique set of decreasing integers, wherein a second level of each data structure includes a plurality of unique sets of decreasing integers, wherein each of the plurality of unique sets is linked to one of the integers in the first unique set, wherein each integer in the first unique set represents a first portion of the contact identifier and each integer in the plurality of unique sets represent a second portion of the contact identifier;

a search interface in communication with the database manager program and operable in accord with second instructions, the second instructions for performing query operations on the contact data records using the indexed data structures to find a union set between a first data structure representing a first set of contacts and a second data structure representing a second set of contacts by performing a first series of comparison operations between the first level integer sets of the first and second data structures to identify matched and unmatched integers in the first level of the first and second data structures;

if a first integer of the first level of the first data structure is not found in the first level of the second data structure, retrieving the unique set of second level integers that is linked to the first integer and storing the unique set of second level integers in the second level of an indexed data structure, and adding the first integer to the union set;

if a matched integer is identified in the first level integer sets, performing a second series of comparison operations between the second level integer sets of the first and second data structures to identify matched and unmatched integers in the second level integer sets of the first and second data structures, and storing the matched and unmatched integers in the second level of the second data structure with a link to the matched integer in the first level of the second data structure; and repeating the steps of performing the first and second series of comparison operations until done.

\* \* \* \* \*